(12) United States Patent
Lieberman et al.

(10) Patent No.: US 7,762,423 B2
(45) Date of Patent: *Jul. 27, 2010

(54) FLOW CONTROL ELEMENT FOR USE WITH LEAK-PROOF CUP ASSEMBLIES

(75) Inventors: Joshua S. Lieberman, Pompton Lakes, NJ (US); Frank Manganiello, Centreville, MA (US); Michael Maloney, Bolton (CA)

(73) Assignee: Playtex Products, Inc., Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/342,403

(22) Filed: Jan. 30, 2006

(65) Prior Publication Data

US 2006/0151499 A1 Jul. 13, 2006

Related U.S. Application Data

(63) Continuation of application No. 10/674,284, filed on Sep. 29, 2003, now abandoned, which is a continuation of application No. 10/437,413, filed on May 13, 2003, now abandoned, which is a continuation-in-part of application No. 10/155,636, filed on May 23, 2002, now abandoned, which is a continuation of application No. 09/645,975, filed on Feb. 4, 2000, now Pat. No. 6,422,415, which is a continuation of application No. 09/019,765, filed on Feb. 6, 1998, now Pat. No. 6,050,445.

(51) Int. Cl.
*A47G 19/22* (2006.01)

(52) U.S. Cl. .......................... 220/714; 220/717; 215/11.4
(58) Field of Classification Search .................. 220/714, 220/717, 203.11; 251/342; 137/493.8, 843, 137/845; 215/11.4

See application file for complete search history.

(56) References Cited

U.S. PATENT DOCUMENTS

| | | | | | |
|---|---|---|---|---|---|
| 1,593,025 | A | * | 7/1926 | MacDonald | 401/263 |
| 1,919,859 | A | * | 7/1933 | Phillips | 401/264 |
| 2,068,213 | A | * | 1/1937 | Wilson | 401/264 |
| 2,316,516 | A | * | 4/1943 | Hammerstein | 222/490 |
| 2,417,968 | A | * | 3/1947 | Browne | 137/850 |
| 2,483,750 | A | * | 10/1949 | Bratrud | 30/162 |
| 5,304,155 | A | * | 4/1994 | Lui | 604/247 |
| 5,554,136 | A | * | 9/1996 | Luther | 604/264 |
| 5,807,349 | A | * | 9/1998 | Person et al. | 604/247 |
| 5,890,619 | A | * | 4/1999 | Belanger | 220/713 |

(Continued)

FOREIGN PATENT DOCUMENTS

GB 2169210 A * 7/1986

*Primary Examiner*—Anthony Stashick
*Assistant Examiner*—James N Smalley
(74) *Attorney, Agent, or Firm*—Ohlandt, Greeley, Ruggiero & Perle, LLP

(57) ABSTRACT

There is provided a flow control element for use with a drinking cup cap having a first mating member in fluid communication with a spout aperture. The flow control element has a first stack and a first valve. The first stack has an upper portion that can be positioned to be removably sealed in or with the cap. The first valve is defined in a sidewall of the first stack and is configured to provide selective fluid communication with the spout aperture.

49 Claims, 6 Drawing Sheets

U.S. PATENT DOCUMENTS

| | | | | |
|---|---|---|---|---|
| 6,325,236 | B1* | 12/2001 | Wong | 220/713 |
| 6,568,557 | B2* | 5/2003 | Fusco et al. | 220/714 |
| 6,880,713 | B2* | 4/2005 | Holley, Jr. | 215/11.4 |
| 2004/0195253 | A1* | 10/2004 | Boucher et al. | 220/714 |
| 2005/0043703 | A1* | 2/2005 | Nordgren | 604/500 |
| 2005/0072788 | A1* | 4/2005 | Lieberman et al. | 220/714 |
| 2005/0283122 | A1* | 12/2005 | Nordgren | 604/247 |

* cited by examiner

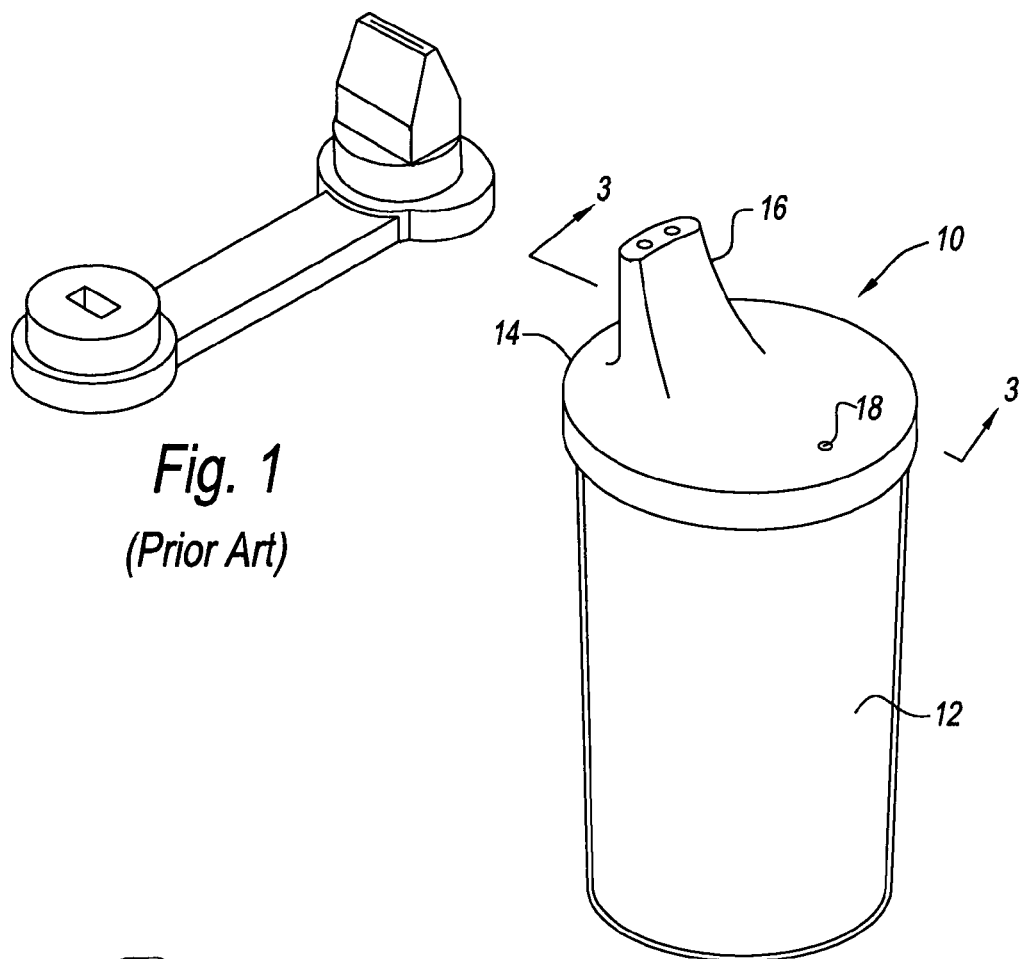
Fig. 1
(Prior Art)
Fig. 2
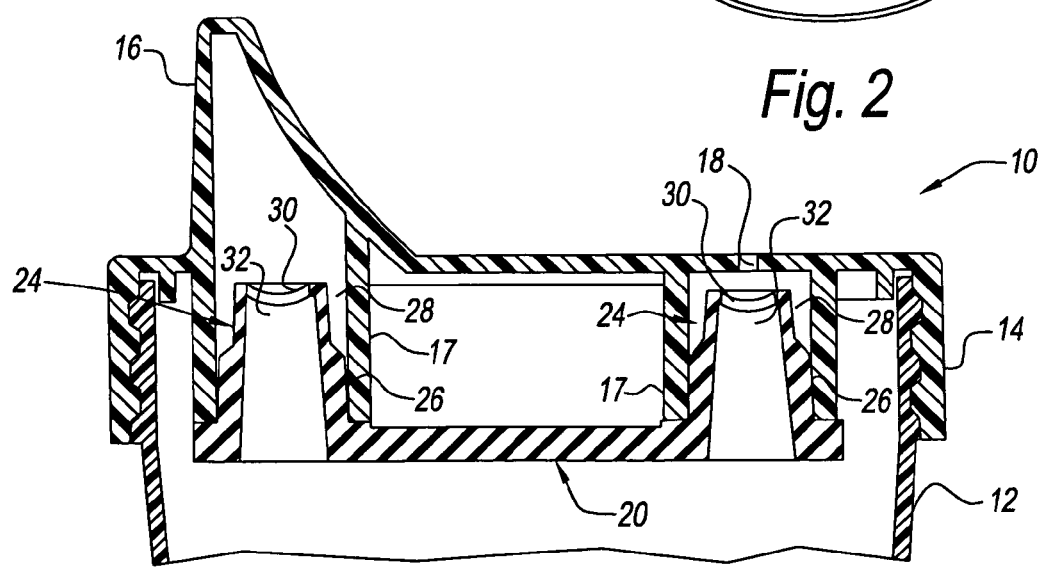
Fig. 3
(Prior Art)

FLOW CONTROL ELEMENT FOR USE WITH LEAK-PROOF CUP ASSEMBLIES

CROSS REFERENCE TO RELATED APPLICATIONS

This application is a continuation of U.S. application Ser. No. 10/674,284 filed on Sep. 29, 2003 now abandoned, which is a continuation of U.S. application Ser. No. 10/437,413 filed on May 13, 2003 now abandoned, which is a continuation-in-part application of U.S. application Ser. No. 10/155,636 filed on May 23, 2002 now abandoned, which is a continuation of U.S. application Ser. No. 09/645,975 filed on Feb. 4, 2000, now U.S. Pat. No. 6,422,415, which is a continuation of U.S. application Ser. No. 09/019,765 filed on Feb. 6, 1998, now U.S. Pat. No. 6,050,445, the disclosures of which are incorporated in their entirety herein by reference.

BACKGROUND OF THE INVENTION

1. Field of the Invention

The present invention relates generally to flow control elements. More particularly, the present invention relates to flow control elements for leak-proof cup assemblies.

2. Description of the Prior Art

Enclosed cups having drinking spouts and air vents that allow the user to drink from the spout without creating excessive vacuum in the cup, are known in the art. However, drinking spouts and air vents are liable to leak liquid stored in the cup between feedings, or if dropped, shaken, or inverted during use. Accordingly, certain cups have been developed that use valving mechanisms at the spout and at the air vent. These valves respond to suction generated during feeding to open, allowing liquid to pass through the spout and allowing air to enter the air vent when a vacuum is developed in the interior of the cup.

Three patents disclosing such valves are U.S. Pat. No. 5,079,013 to Belanger, U.S. Pat. No. 5,542,670 to Morano, and U.S. Pat. No. 6,505,445 to Manganiello, all of which are commonly owned by the assignee of the present application. Applicant has on the market a cup that employs a valve assembly that is shown in U.S. Pat. No. 6,050,445. The valve assembly is secured to the underside of the lid or cap of the cup. Applicant is also aware of a prior competitive product having a flow control element of the configuration depicted in FIG. 1, which was sold as part of the Tumble Mates Spill Proof Cup by the First Years®.

Despite the effectiveness of these cup mechanisms, applicant has discovered improved flow control elements and corresponding valve configurations that provide improved fluid flow rates without sacrificing the valves' resistance to spills or the valves' durability.

SUMMARY OF THE INVENTION

It is an object of the present invention to provide a flow control element having a valve located on the side of the element.

It is another object of the present invention to provide a flow control element in which the side of the element has a valve having an arcuate valve face.

It is yet another object of the present invention to provide a flow control element in which the valve has a slit therein.

It is still another object of the present invention to provide a flow control element in which the valve is a valve face having a slit.

It is a further object of the present invention to provide a flow control element in which the side of the element has opposed walls, and one or more of the walls has a valve therein.

It is still a further object of the present invention to provide a flow control element in which the valve is on a side of the element and has a slit with its elongated extent generally along the axis of flow of the liquid from a cup.

These and other objects and advantages of the present invention are achieved by providing a flow control element for use with a drinking cup cap having a first mating member in fluid communication with a spout aperture. The flow control element has a first stack and a first valve defined in a side or sidewall of the first stack. The first stack has an upper portion configured to be removably sealed in the first mating member of the cap. The first valve is configured to provide selective fluid communication with the spout aperture through the flow control element.

Also provided is a flow control element that has a first stack with an upper portion and a lower portion. The upper portion is configured to be removably sealed within the first mating surface. The lower portion is sized and configured to engage inner and outer sides of the first mating surface. A first valve is defined in the first stack and is configured to provide selective fluid communication with the spout aperture through the flow control element.

There is also provided a drinking cup assembly that comprises a cup, a cap, and a flow control element. The cup has an open end and the cap is adapted to seal the open end. The cap has a first aperture and a first mating surface in fluid communication with the first aperture. The flow control element has a first stack and a first valve defined in a sidewall of the stack. The first stack has an upper portion that can be removably sealed within the first mating surface. The first valve is configured to selectively place the cup in fluid communication with the first aperture.

Still further, there is provided a drinking cup assembly that comprises a cup, a cap, and a flow control element. The cap has a first aperture defined in a drinking spout and a first mating member in fluid communication with the first aperture. The flow control element has a portion that is sized and configured to frictionally engage inner and outer sides of the first mating member and thereby place the first stack in fluid communication with the first aperture.

BRIEF DESCRIPTION OF THE DRAWINGS

FIG. 1 is a perspective view of a prior art valve mechanism;

FIG. 2 is a perspective view of a cup assembly;

FIG. 3 is a sectional view taken along the lines 3-3 in FIG. 2;

DETAILED DESCRIPTION OF THE INVENTION

Figure 4:
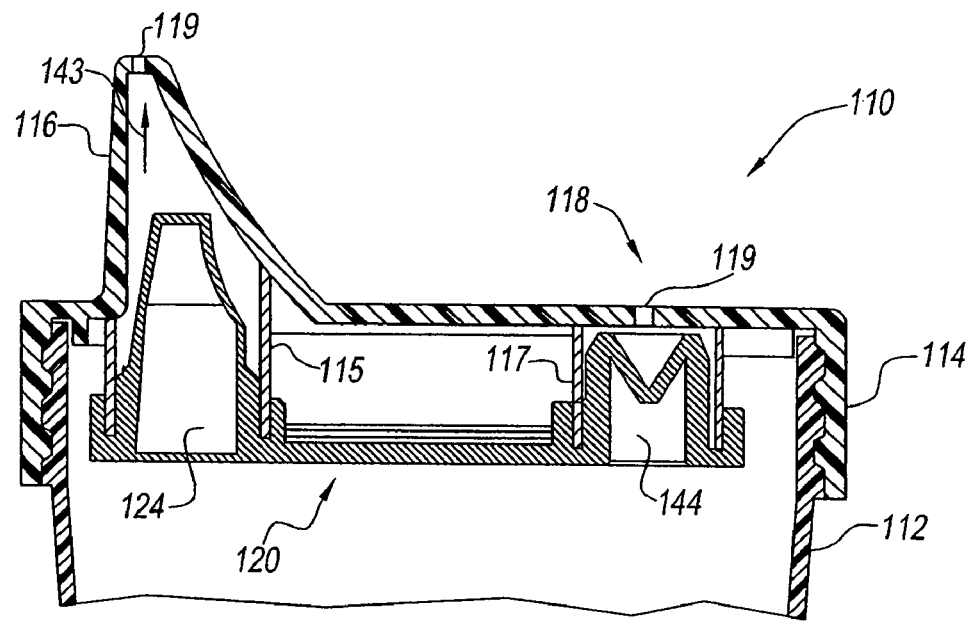
FIG. 4 is a sectional view taken along the lines 3-3 in FIG. 2, with an alternate embodiment of a flow control element according to the present invention.

Referring to the figures and, in particular, FIGS. 2 and 3, there is provided an overall cup assembly of the present invention that is generally referred to by reference numeral 10. The cup assembly 10 includes a cup 12, a cap 14, and a flow control element 20. Cap 14 has a spout 16 and, preferably, an air vent 18.

Cap 14 is formed with mating surfaces that are preferably adjacent to or incorporated into spout 16 and air vent 18, and can frictionally engage flow control element 20 to place the flow control element in fluid communication with spout 16 and air vent 18. In the embodiment depicted in FIGS. 2 and 3, cap 14 is formed with cylindrical recesses 17 in spout 16 and below air vent 18. These recesses 17 are configured to accept flow control element 20.

Referring to FIG. 3, control element 20 has one or more stacks 24. Each stack 24 is substantially cylindrical, and the resulting inner contour presents a simple, wide opening cylinder to enable thorough cleaning of the stack after use and to minimize the number of corners and niches in which dried or congealed liquid can be deposited. It is preferred that the outer contour of stacks 24 be stepped, as shown in FIGS. 3 and 4, but that the inner contour of the stacks be a constant diameter or of constantly diminishing diameter, thus presenting a smooth, unstepped inner face. Thus, the smooth inner face is preferably either cylindrical, frustoconical, or a combination of the two. This smooth inner face further enhances free fluid flow and promotes easy cleaning of stack 24. The fact that this flow control element 20 is easy to clean is very important both to the proper and sanitary functioning of the assembly 10, and also to consumer acceptance of the element.

In the embodiment shown in FIG. 3, each stack 24 of control valve 20 has a concave shaped upper valve face 30, preferably with the attendant curved shape of slits 32. It has been found that elongated single slits 32 are preferable to cross-cuts or other types of apertures through valve faces 30. It is also preferred that slits 32 extend substantially from edge to edge of concave valve faces 30.

The most preferred length of slit 32 that is aligned with spout 16, is about 0.235 inches. The most preferred length of slit 32 that is aligned with air vent 18, is about 0.17 inches. The most preferred inner diameter of the stack 24 that is aligned with spout 16, is from about 0.299 inches to about 0.368 inches, ideally a frustoconical shape having the foregoing as minimum and maximum diameters. The most preferred inner diameter of the stack 24 that is aligned with air vent 18, is from about 0.247 inches to about 0.300 inches, and is ideally a frustoconical shape having the foregoing as minimum and maximum diameters. The most preferred height of the stack 24 that is aligned with spout 16, is about 0.803 inches from top to bottom, and about 0.521 inches from indentation to bottom. The most preferred height of the stack 24 that is aligned with air vent 18, is about 0.73 from top to bottom, and about 0.55 from indentation to bottom. The two stacks 24 are preferably 1.6 inches on center. The preferred outer diameter of the lower portion 26 of the stack 24 that is aligned with spout 16, is about 0.545 inches. The preferred outer diameter of the lower portion 26 of the stack 24 that is aligned with air vent 18, is about 0.490 inches. These dimensions provide a friction fit with a cup lid having cylindrical recesses 17 having preferred inner diameters of about 0.499 inches and about 0.439 inches, respectively. All of the foregoing measurements are subject to a preferred tolerance of plus or minus about 0.005 inches.

It is preferred that the flow control element 20 is formed from a single piece of elastomeric material, which facilitates easy insertion into and removal from recesses 17. However, flow control element 20 can be formed of two separate valving elements or stacks 24, each adapted to be inserted into recesses 17 or otherwise engage cap 14. The elastomeric material used is most preferably silicone, but TPE (thermoplastic elastomer), natural rubber, and synthetic rubber (e.g., isoprene) are also preferred.

Referring now to FIG. 4, an alternate exemplary embodiment of flow control element 120 is illustrated in use with a cup assembly 110. Cup assembly 110 includes a cup 112, a cap 114 having a spout 116 and, preferably, an air vent 118. Cap 114 can seal cup 112, with the exception of apertures 119 formed in spout 116 and air vent 118. Cap 114 is formed with a first mating member or recess 115 that aligns with spout 116 and a second mating member or recess 117 that aligns with air vent 118. Flow control element 120 can communicate with spout 116 and air vent 118, to form the entirely or substantially entirely spill-proof assembly 10.

Flow control element 120 is configured to be received in first and second mating members 115, 117 of cap 114. Specifically, flow control element 120 has a first stack 124 and, preferably, a second stack 144.

First stack 124 is disposed proximate to spout 116 and second stack 144 is disposed proximate to air vent 118. The first and second stacks 124, 144 can selectively place cup 112 in fluid communication with apertures 119 of spout 116 and air vent 118, respectively. In some embodiments, control element 120 has only a single stack, namely first stack 124 that mates with a single mating member or other device for attaching the valve stack to cap 114, yet permits the selective flow of liquid from the cup 112 to spout 116 and permits selective flow of venting air into the cup through the spout.

Figure 5:
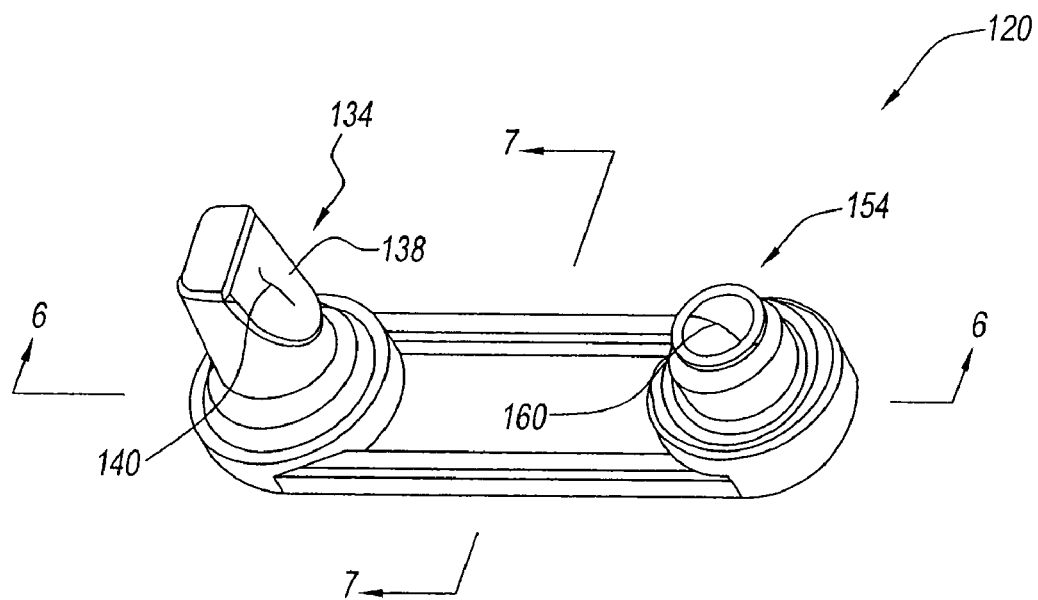
FIG. 5 is a perspective view of the flow control element of FIG. 4.
Figure 6:
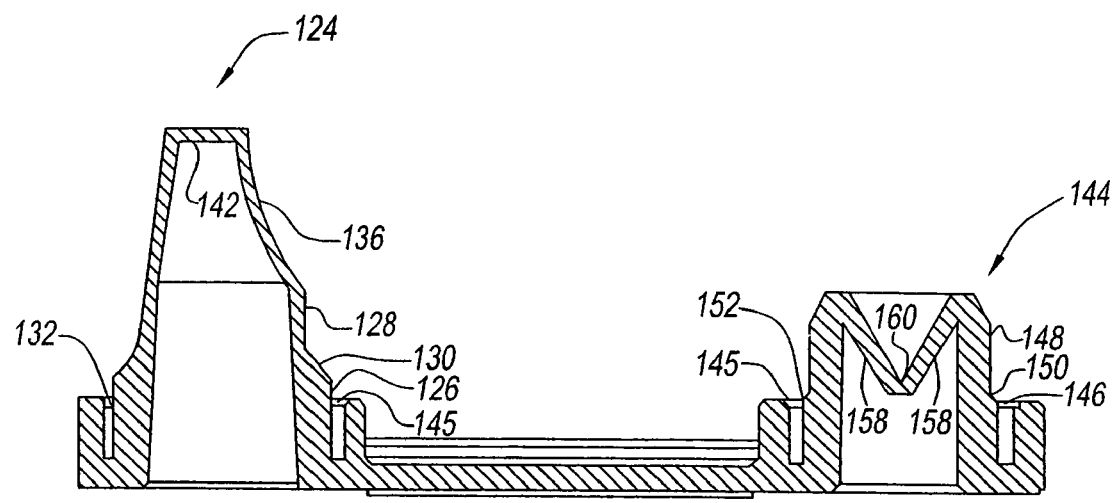
FIG. 6 is a sectional view taken along lines 6-6 of the flow control element in FIG. 5.

Flow control element 120 is described below with simultaneous reference to FIGS. 5 through 7. First stack 124 has a lower portion 126 and an upper portion 128. Similarly, second stack 144 also has a lower portion 146 and an upper portion 148. It is preferred that the outer dimension of upper portions 128, 148 is smaller than the outer dimension of lower portions 126, 146, respectively. Namely, first stack 124 has a step or transition portion 130 between its upper portion 128 and its lower portion 126. In addition, second stack 144 has a step or transition portion 150 between its upper portion 148 and its lower portion 146.

First mating member 115 is configured to accept first stack 124, and second mating member 117 is configured to accept second stack 144. Specifically, lower portion 126 of first stack 124 is configured to be frictionally received in first mating member 115, and lower portion 146 of second stack 144 is configured to be frictionally received in second mating member 117. Since the outer dimension of upper portions 128, 148 is smaller than the lower portions 126, 146, the upper portions preferably do not come in contact with the inside surface of the mating members 115, 117.

In order to form the desired friction fit, mating members 115, 117 and lower portions 126, 146 preferably have a complimentary shape. For example, mating members 115, 117 and lower portions 126, 146 can be substantially cylindrical in shape as illustrated. Of course, other complimentary shapes are contemplated. The friction fit between the inside surface of the mating members and the outside surface lower portions of each stack forms a substantially air-tight seal between flow control element 120 and cap 114.

To further improve the seal and retention forces between mating members 115, 117 and stacks 124, 144, the lower portions 128, 148, respectively, can also include a retaining rim. For example, lower portion 126 of first stack 124 can have a first retaining rim 132, while lower portion 146 of second stack 144 can have a second retaining rim 152.

Lower portions 126, 146 are pressed into mating members 115, 117, respectively, until retaining rims 132, 152 are received about and form a friction fit with the outside surface of mating members, respectively. Thus, retaining rims 132, 152 allow each stack 124, 144 to form a friction fit with both the inside and outside of mating members 115, 117. Further, lower portions 126, 146 can be pressed into mating members 115, 117, respectively, until retaining rims 132, 152 are received about the mating members so that the rims engage three sides (e.g., inside, outside, and bottom) of the mating members.

Since retaining rims 132, 152 allow stacks 124, 144 to engage at least the inside and the outside surfaces of members 115, 117, the tolerance between the outer dimension of lower portions 126, 146 and the inner dimension of the mating members can be relaxed or increased. Retaining rims 132, 152 not only allow the tolerances to be relaxed, but more importantly the rims allow the length of engagement between mating members 115, 117 and stacks 124, 144 to be reduced. Thus, mating members 115, 117 and stacks 124, 144 can be completely engaged in a much shorter stroke than previously possible.

Retaining rims 132, 152 can also include a chamfer 145 to further ease the insertion of stacks 124, 144 onto mating members 115, 117, respectively. Thus, flow control element 120 can be easier to insert into and/or remove from mating members 115, 117 than previously possible.

For example, each lower portion 126, 146 can have an outer dimension that is smaller than was previously possible. Lower portion 126 can have a diameter of about 0.52 inches and lower portion 146 can have a diameter of about 0.455 inches. These dimensions provide a friction fit of about 0.021 inches when first mating member 115 has a diameter of about 0.499 inches and a friction fit of about 0.016 inches when second mating member 117 has a diameter of about 0.439 inches. The relaxed tolerances can make it easier to engage/disengage flow control element 120 with cap 114. Yet, lower portions 126, 146 form a substantially airtight seal by forming a friction fit with at least the inside and outside surfaces of mating members 115, 117, respectively.

Mating members 115, 117 and stacks 124, 144 are spaced apart from one another a selected distance. For example, mating members 115, 117 and stacks 124, 144 can be spaced apart from one another about 1.6 inches on center.

Figure 7:
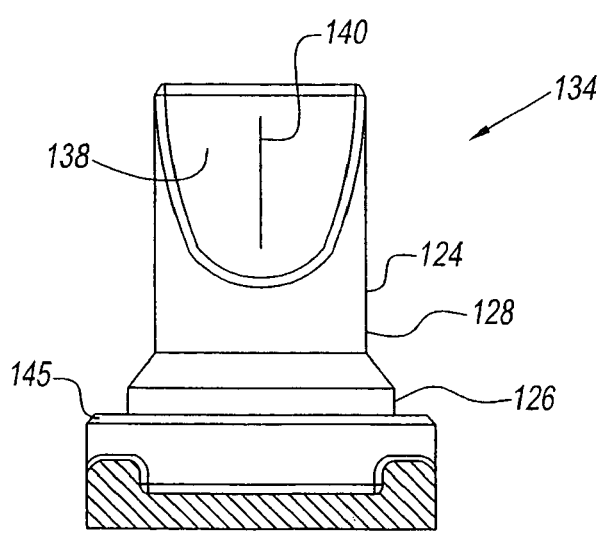
FIG. 7 is a sectional view taken along lines 7-7 of the flow control element in FIG. 5.
Figure 8:
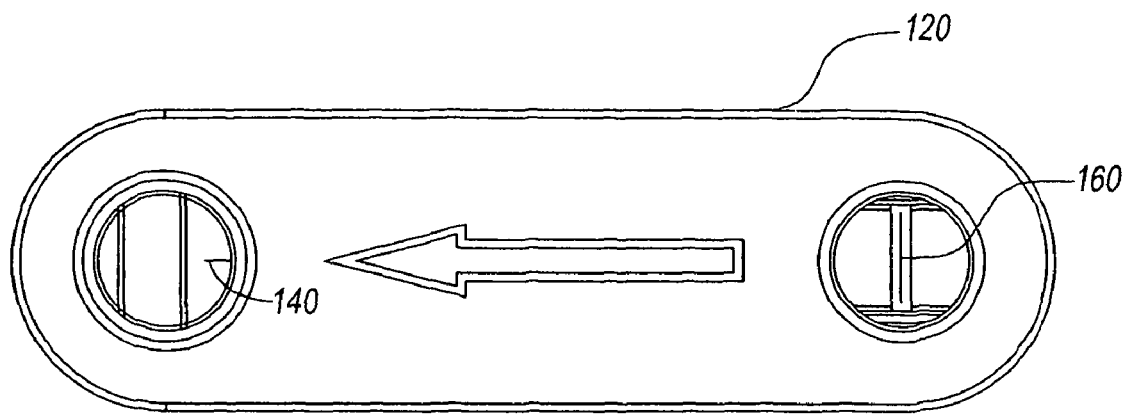
FIG. 8 is a bottom view of the flow control element of FIG. 5.
Figure 9:
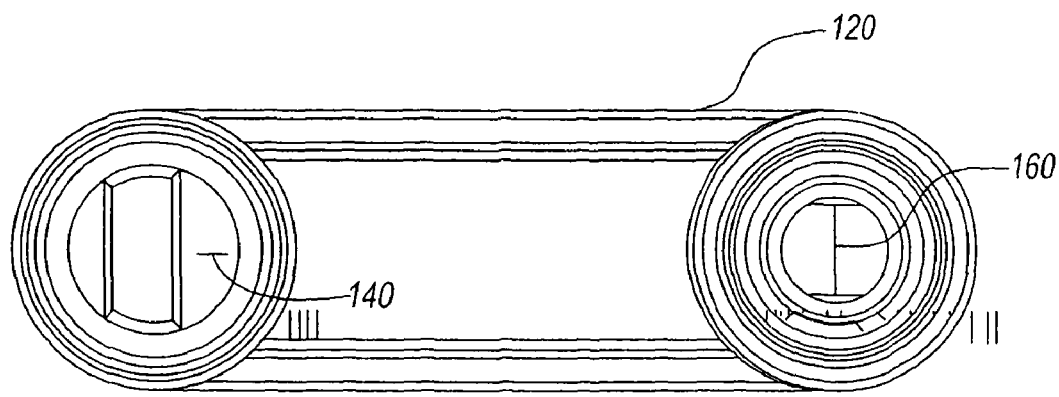
FIG. 9 is a top view of the flow control element of FIG. 5.

Referring to FIG. 7, first stack 124 of flow control element 120 has a first valve 134. The first valve 134 is disposed in a sidewall 136 of stack 124. First valve 134 has a valve face 138 and a valve slit 140. Valve face 138 has a substantially planar shape having a slight arcuate curvature and is disposed in upper portion 128 of first stack 124 proximate to spout 116. Thus, valve face 138 is defined on sidewall 136 of first stack 124.

Slit 140 is a normally closed slit defined in valve face 138. Slit 140 can be positioned in face 138 in any selected orientation. For example, in the illustrated embodiment, slit 140 has a substantially vertical orientation. In vertical orientation, the elongated extent of slit 140 is generally along an axis of flow 143 of the liquid. Of course, slit 140 with other orientations, such as, but not limited to, substantially horizontal (e.g., normal to axis 143) or an angled orientation, are contemplated for use with the present invention.

It should also be recognized that first stack 124 is described herein by way of example only as including one first valve 134, where the first valve includes one valve face 138 and one valve slit 140. Of course, first stack 124 can have more than one valve, more than one valve face, and/or for each valve face to include more than one slit. For example, first valve 134 can include multiple slits 140 in a cris-cross orientation, a cross-slit orientation or possibly an aperture, however the latter is less preferred.

Also, valve face 138 is described herein by way of example as being substantially planar with a slightly arcuate curvature. Of course, faces having other configurations such as, but not limited to, non-planar faces are contemplated. For example, face 138 and sidewall 136 can be one-in-the-same.

Several advantages are provided by placing first valve 134 in sidewall 136. For example, since first valve 134 is located at sidewall 136, liquid in cup 112 exerts less of a force directly on valve face 138 or slit 140 in the event the cup is dropped, inverted and/or shaken. In fact, the arcuate shape of valve face 138 in the illustrated embodiment channels liquid away from slit 140 towards a top end 142 of first stack 124. The exertion of less of the force from the shaken or inverted liquid on slit 140 has been found useful in providing a more leak-proof design than previously possible, while not affecting the ability of valve 134 to selectively place aperture 119 in fluid communication with cup 112 when desired.

Additionally, moving first valve 134 to sidewall 136 of stack 124 allows the length of valve slit 140 to be increased as compared to prior valves. Some prior valves had slits that were located at the top of the stack. In these valves, the length of the slit was constrained by the diameter of the stack. However, placing first valve 134 on sidewall 136 of stack 124 allows the length of slit 140 to be increased to match all or substantially all of the height of the stack, if necessary. Increasing the length of slit 140 can increase the flow of fluid through the slit when first valve 134 is opened.

The slits and valve faces at the top of the stack of some prior valves have been known to be constrained by rim-stresses due to the cylindrical configuration of the stack. In contrast, moving first valve 134 to sidewall 136 of stack 124 also can remove these constraints. This can make first valve 134 easier to open when desired, even without increasing the length of slit 140.

Further, moving first valve 134 to sidewall 136 allows each stack 124 to have more than one valve. Again, some prior valves were located at the top of the stack. In these valves, placing more than one valve at the top of the stack was not possible, or at best very expensive to manufacture, due to the diameter of the stack. However, placing first valve 134 on sidewall 136 of stack 124 allows the stack to have more than one valve in that stack, if necessary.

The most preferred length of slit 140 that is aligned with spout 116, is about 0.205 inches. The most preferred inner diameter of first stack 124 that is aligned with spout 116, is from about 0.314 inches to about 0.360 inches. Also preferably, first stack 124 has a frustoconical shape. The most preferred height of first stack 124 that is aligned with spout 116, is about 0.884 inches from top to bottom.

Second stack 144 has a second or vent valve 154. Vent valve 154 is preferably a duckbill style valve. Vent valve 154 preferably has a pair of bill-like flaps 158, which are configured to mate along a slit 160. It should be recognized that vent valve 154 is described as a duckbill valve by way of example only. Of course, other types of air venting valves are contemplated.

The most preferred length of slit 160 that is aligned with air vent 118, is about 0.205 inches. The most preferred inner diameter of second stack 144 that is aligned with air vent 118, is from about 0.268 inches to about 0.294 inches. As with first stack 124, the shape of second stack 144 is preferably frustoconical. The most preferred height of second stack 144 that is aligned with air vent 118, is about 0.487 from top to bottom.

In use, a user applies a vacuum or suction to spout 116. Aperture 119 at spout 116 is in fluid communication with first valve 134. Thus, the user-applied suction forms a negative pressure on valve face 138. Once the suction reaches a first predetermined limit, the pressure overcomes the resiliency of valve face 138, causing at least a portion of the valve face to deflect. The deflection of valve face 138 in turn causes slit 140 to open, which allows the contents of cup 112 to be drawn from the cup by the negative pressure.

Once the negative pressure within cup 112 reaches a second predetermined limit, the pressure overcomes the resiliency of flaps 158, causing one or more of them to deflect. The deflection of flaps 158 in turn causes slit 160 to open, which allows the air from outside of cup 112 to be drawn into the cup.

The elastomeric properties of first and second stacks 124, 144, and thus first and second valves 134 and 154 are sufficient to close slits 140, 160, respectively, upon the removal of the suction force below the first and second predetermined limits, respectively.

Steps 130, 150 ensure that upper portions 128, 148 do not come in contact with the inside surface of mating members 115, 117. This allows first and second valves 134, 154 to operate as intended without unintended affects that could be caused by stresses imparted on upper portions 128, 148 if contact with mating members 115, 117 were allowed.

The elongated shape of first stack 124 enables it to place valve face 138 in close proximity to aperture 119 in spout 116. In addition, the arcuate shape of valve face 138 is configured to correspond to the shape of spout 116, which allows the valve face to be in closer proximity to aperture 119 than in previous systems.

The inner and outer diameter of first stack 124 permits significant, relatively unconstrained fluid flow to the area of first valve 134. It has been found that this arrangement provides optimal balancing of suction needed to open the valve and for fluid to flow through the valves. Similarly, its substantial cylindrical diameter and resulting inner contour presents a simple, wide opening and tube to enable thorough cleaning of first stack 124. The fact that this preferred flow control element 120 is easy to clean is very important both to the proper and sanitary functioning of the assembly 110, and also to consumer acceptance of the element.

Turning now to FIGS. 10 through 13, another alternate exemplary embodiment of flow control element 220 is illustrated. Flow control element 220 has a first stack 224 and, preferably, a second stack 244.

First stack 224 has an upper portion 226 and a lower portion 228. Similarly, second stack 244 also has an upper portion 246 and a lower portion 248. It is preferred that the outer dimension of upper portions 226, 246 is smaller than the outer dimension of lower portions 228, 248, respectively. Namely, first stack 224 has a step or transition portion 230 between its upper portion 226 and its lower portion 228. Also, second stack 244 has a step or transition portion 250 between its upper portion 246 and its lower portion 248.

Lower portion 228 of first stack 224 is configured to be frictionally received in the first mating member of the cap, and lower portion 248 of second stack 244 is configured to be frictionally received in the second mating member of the cap.

In order to form the desired friction fit, the cap's mating members and lower portions 228, 248 preferably have a complimentary shape. For example, the mating members and lower portions 228, 248 can be substantially cylindrical in shape as illustrated. Of course, other complimentary shapes are contemplated. The friction fit between the inside surface of the mating members and the lower portions of each stack forms a substantially air-tight seal between flow control element 220 and the cap.

It is also contemplated for stacks 224, 244 to include a retaining rim (not shown) to further improve the seal between the stacks and the mating members of the cap. The retaining rims can allow each stack 224, 244 to form a friction fit with at least the inside and outside surfaces of the cap's mating members. In addition, stacks 224, 244 can be pressed into the cap's mating members until the retaining rims engage three sides (e.g., inside, outside, and bottom) of the mating members.

First stack 224 has a pair of first valves 234. Each first valve 234 is disposed in opposing sidewalls 236 of stack 224. Each first valve 234 has a valve face 238 and a valve slit 240. Valve face 238 has a substantially planar shape and is defined in sidewall 236 of upper portion 226.

Slit 240 is a normally closed slit defined in valve face 238. Slit 240 can be positioned in face 238 in any selected orientation. For example, in the illustrated embodiment, slit 240 has a substantially vertical orientation. Of course, slit 240 with other orientations, such as, but not limited to, substantially horizontal or an angled orientation, are contemplated for use with the present invention. Also, first valves 234 can each include multiple slits 240 in a cross-slit orientation or possibly an aperture, however, the latter is less preferred.

Also, valve face 238 is described herein by way of example as being substantially planar. Of course, non-planar valve faces are contemplated. Further, each stack 224, 244 is described herein by way of example as having only one valve face. Of course, more than one valve face on either or both of the stacks is contemplated by the present invention.

Again, advantages are provided by placing first valves 234 in sidewall 236. For example, liquid in the cup exerts less of the force on valve faces 238 or slits 240 in the event the cup is inverted and/or shaken. Rather, liquid is directed at top end 242 of first stack 224. Exerting less of the force of the shaken or inverted liquid on faces 238/slits 240 has been found useful in providing a more leak-proof design than previously possible, while not affecting the ability of first valves 234 to selectively place the cap's apertures in fluid communication with the cup when desired.

Also, moving first valves 234 to sidewall 236 of stack 224 allows the length of slit 240 to be increased, if needed, as compared to prior valves and/or allows each stack 224 to have more than one valve, which was also not possible in prior valves. Further, moving first valves 234 to sidewall 236 of stack 224 can also remove the rim-stress that can be caused on the slits and valve faces at the top of the stack of some prior valves. Accordingly, first valves 234 can be easier to open when desired, even without increasing the length of slits 240.

The most preferred length of slit 240 that is aligned with the spout, is about 0.205 inches. The most preferred inner diameter of first stack 224 that is aligned with the spout, is from about 0.340 inches to about 0.425 inches. Also preferably, first stack 224 has a frustoconical shape. The most preferred height of first stack 224 that is aligned with the spout, is about 0.830 inches from top to bottom.

Second stack 244 has a second or vent valve 254. Vent valve 254 preferably has a concave shaped valve face 258, preferably with a slit 260 as described in detail above with respect to FIG. 3. Of course, other types of air venting valves are contemplated.

In use, a user applies a vacuum or suction to the cap's spout. The aperture at the spout is in fluid communication with first valves 234. Thus, the user-applied suction forms a negative pressure on valve faces 238. Once the suction reaches a first predetermined limit, the pressure overcomes the resiliency of valve faces 238, causing at least a portion of the valve faces to deflect. The deflection of valve faces 238 in turn causes slits 240 to open, which allows the contents of the cup to be drawn out by the negative pressure.

Once the negative pressure within the cup reaches a second predetermined limit, the pressure overcomes the resiliency of vent valve 254, which allows the air from outside of the cup to be drawn in.

The elastomeric properties of first and second stacks 224, 244, and thus first and second valves 234 and 254 are sufficient to close the valves upon the removal of the suction force below the first and second predetermined limits, respectively.

Figure 10:
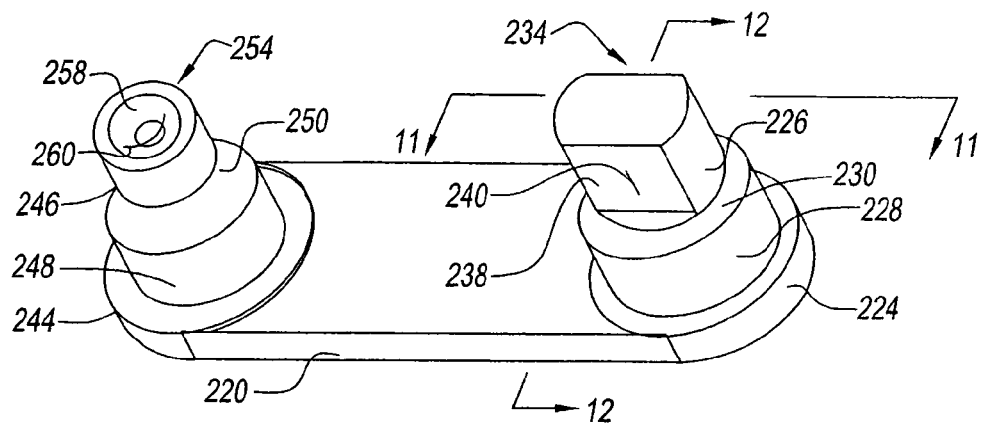
FIG. 10 is a perspective view of another alternate embodiment of a flow control element according to the present invention.
Figure 11:
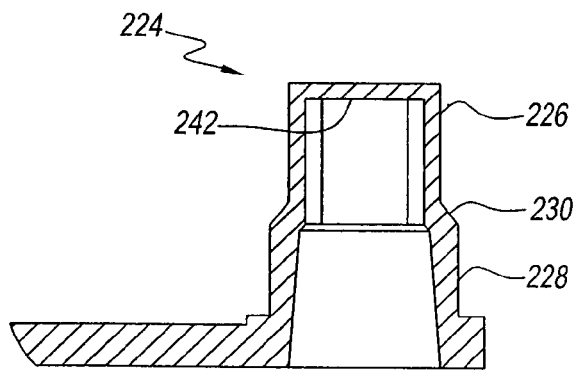
FIG. 11 is a sectional view of the flow control element taken along lines 11-11 in FIG. 10.
Figure 12:
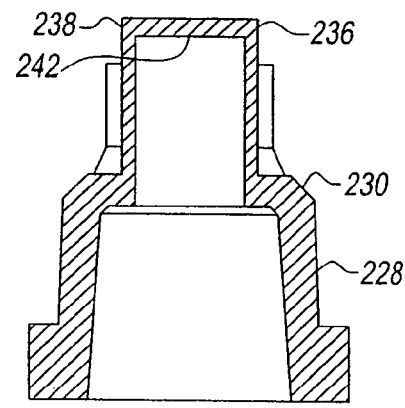
FIG. 12 is a sectional view of the flow control element taken along lines 12-12 in FIG. 10.
Figure 13:
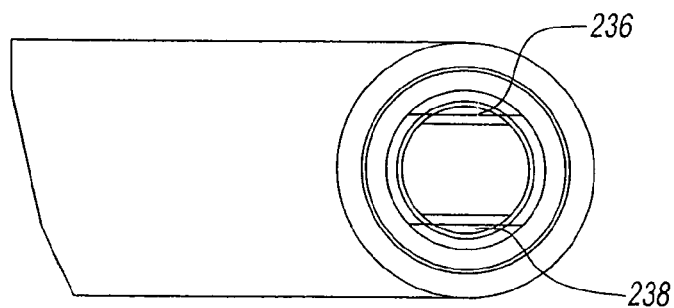
FIG. 13 is a top view of a portion of the flow control element of FIG. 10.
Figure 14:
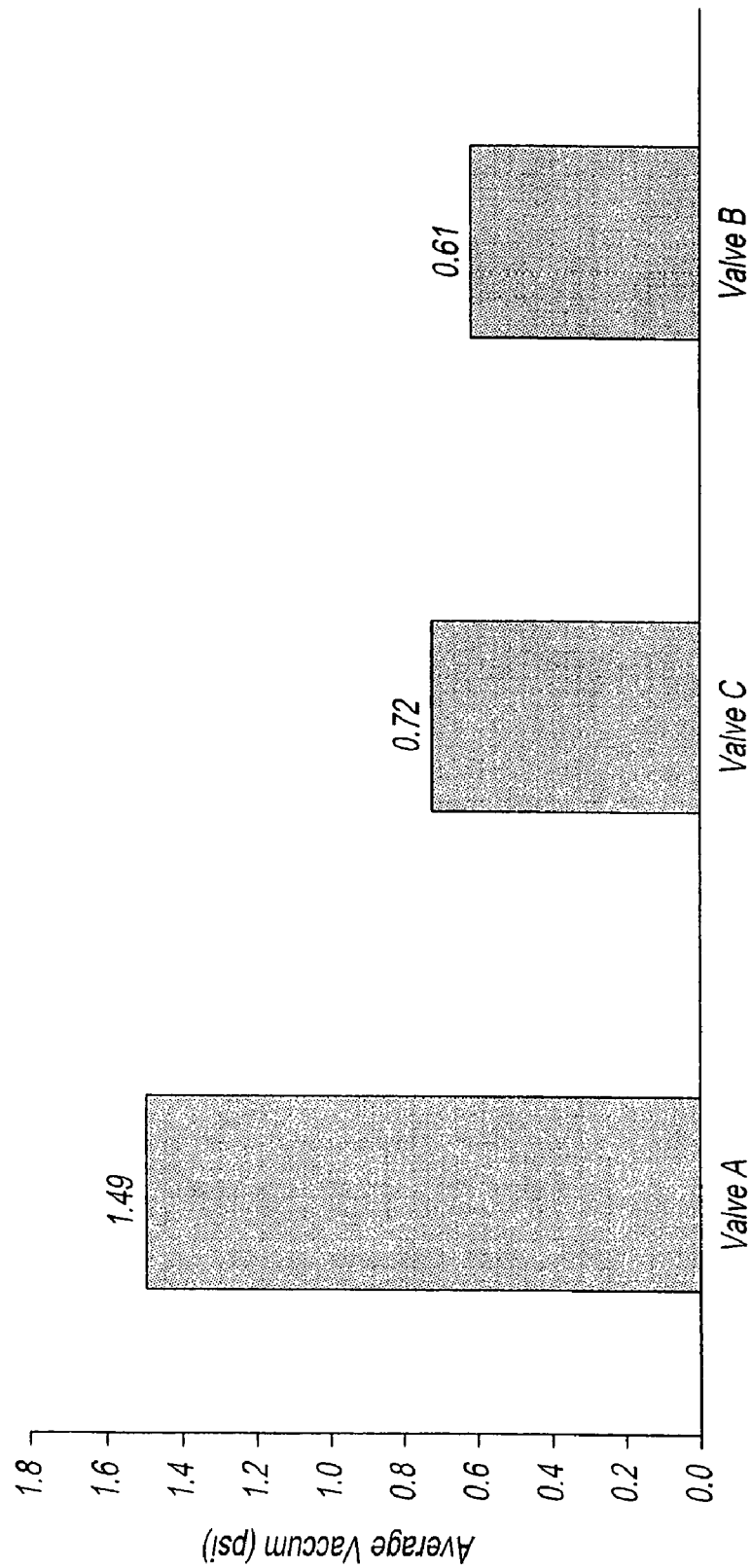
FIG. 14 is a bar graph comparing various embodiments of the flow control element of the present invention.

The following data compares the flow characteristics of flow control elements 20, 120, and 220 of the present invention. Ten samples of a flow control element as depicted in FIG. 3 (Valve A) were tested against ten samples of a flow control valve as depicted in FIG. 5 (Valve B), and against ten samples of a flow control valve as depicted in FIG. 10 (Valve C). During this comparison, a vacuum measured in pounds per square inch (psi) was applied to the spout. The vacuum was initially set at 0.36 psi, and slowly increased until a selected minimum flow rate measured in milliliter per second (ml/sec) was achieved. The selected minimum flow rate was 1.0±0.1 ml/sec. Once the proper vacuum was achieved, the valve was tested for time to expel 100 milliliters (ml) of water. The vacuum necessary to achieve the selected minimum flow rate for the ten samples was averaged, and is seen graphically in FIG. 14.

| | Valve A | | | | |
|---|---|---|---|---|---|
| Trial # | Pressure (psi) | Flow Rate (ml/s) | Volume (ml) | Time (sec) | Vent Actuation Pressure (psi) |
| 1 | 1.34 | 0.99 | 100 | 101.5 | 1.08 |
| 2 | 1.70 | 0.99 | 100 | 100.9 | 1.08 |
| 3 | 1.16 | 0.99 | 100 | 101.1 | 1.23 |
| 4 | 1.88 | 1.10 | 100 | 91.0 | 1.70 |
| 5 | 1.16 | 0.92 | 100 | 108.4 | 1.26 |
| 6 | 1.48 | 0.98 | 100 | 101.6 | 1.08 |
| 7 | 1.52 | 1.03 | 100 | 97.0 | 1.08 |
| 8 | 1.55 | 0.99 | 100 | 100.6 | 1.12 |
| 9 | 1.59 | 0.94 | 100 | 106.0 | 1.08 |
| 10 | 1.55 | 0.91 | 100 | 109.4 | 1.73 |
| Average: | 1.49 | | | | |
| Standard Deviation: | 0.23 | | | | |

| | Valve B | | | | |
|---|---|---|---|---|---|
| Trial # | Pressure (psi) | Flow Rate (ml/s) | Volume (ml) | Time (sec) | Vent Actuation Pressure (psi) |
| 1 | 0.65 | 0.90 | 100 | 111.1 | 0.36 |
| 2 | 0.61 | 0.98 | 100 | 102.0 | 0.36 |
| 3 | 0.61 | 0.93 | 100 | 107.1 | 0.36 |
| 4 | 0.69 | 1.10 | 100 | 90.5 | 0.36 |
| 5 | 0.65 | 1.00 | 100 | 100.0 | 0.36 |
| 6 | 0.54 | 0.96 | 100 | 104.0 | 0.36 |
| 7 | 0.61 | 0.90 | 100 | 111.0 | 0.36 |
| 8 | 0.54 | 0.97 | 100 | 103.2 | 0.36 |
| 9 | 0.58 | 0.97 | 100 | 103.3 | 0.36 |
| 10 | 0.58 | 0.92 | 100 | 109.1 | 0.36 |
| Average: | 0.61 | | | | |
| Standard Deviation: | 0.05 | | | | |

| | Valve C | | | | |
|---|---|---|---|---|---|
| Trial # | Pressure (psi) | Flow Rate (ml/s) | Volume (ml) | Time (sec) | Vent Actuation Pressure (psi) |
| 1 | 0.83 | 1.02 | 100 | 98.4 | 0.40 |
| 2 | 0.69 | 0.98 | 100 | 101.9 | 0.36 |
| 3 | 0.69 | 1.01 | 100 | 98.7 | 0.36 |
| 4 | 0.69 | 0.94 | 100 | 106.2 | 0.72 |
| 5 | 0.79 | 0.99 | 100 | 101.0 | 0.72 |
| 6 | 0.69 | 0.95 | 100 | 105.6 | 0.36 |
| 7 | 0.76 | 0.97 | 100 | 103.3 | 0.72 |
| 8 | 0.69 | 1.02 | 100 | 97.6 | 0.54 |
| 9 | 0.61 | 0.91 | 100 | 110.0 | 0.36 |
| 10 | 0.72 | 0.93 | 100 | 108.0 | 0.47 |
| Average: | 0.72 | | | | |
| Standard Deviation: | 0.06 | | | | |

The vent actuation pressure is the pressure at which air was first detected to be entering the cup through the vent. Prior to the testing, the slits of all of the valves were initially manually opened by squeezing the valves to eliminate healing effects, which can cause the slits to reseal after manufacture.

The following data represents nominal values in inches of various dimensions of Valve A, Valve B, and Valve C used in the comparison.

| | Valve A | Valve B | Valve C |
|---|---|---|---|
| Spout Wall Thickness at the Slit | 0.024 | 0.020 | 0.024 |
| Spout Slit Length | 0.235 | 0.205 | 0.205 |
| Vent Wall Thickness at the Slit | 0.024 | 0.020 | 0.024 |
| Vent Slit Length | 0.170 | 0.205 | 0.170 |

This data shows that Valve B (FIG. 5) and Valve C (FIG. 10) require minimal suction to achieve the selected minimum flow rate. Moreover, this data shows that Valves B and C provide consistency in the necessary suction from sample to sample, which provides a more acceptable product than previously possible.

It should also be noted that the terms "first", "second", "third", "upper", "lower", and the like may be used herein to modify various elements. These modifiers do not imply a spatial, sequential, or hierarchical order to the modified elements unless specifically stated.

Various modifications may be made to the foregoing disclosure as will be apparent to those skilled in the art. Thus, it will be obvious to one of ordinary skill in the art that the foregoing description and drawings are merely illustrative of certain preferred embodiments of the present invention, and that various obvious modifications can be made to these embodiments in accordance with the spirit and scope of the appended claims.

What is claimed is:

1. A flow control element for use with a drinking cup cap, the cap having a spout aperture and a depending first mating member in fluid communication with the spout aperture, said flow control element comprising: a first stack having an upper portion and a lower portion, said upper portion being configured to be removably sealed adjacent to the spout aperture, wherein said upper portion and said lower portion each have an outer dimension, said outer dimension of said upper portion is smaller than said outer dimension of said lower portion, said lower portion can be frictionally received and sealed in a lower portion of the first mating member, said upper portion extends upwardly in the first mating member toward the spout aperture without being in contact with the cap when said lower portion is sealed in the first mating member, and said upper portion having a sidewall, said sidewall having a first valve, said first valve having a first valve face that is arcuate when viewed in vertical section taken along the axis of flow of said first stack and that defines an arcuate valve slit, said arcuate valve slit having a substantially vertical orientation, the elongated extent of said arcuate valve slit following along the curvature of the arc of the first valve face and along the axis of flow of liquid through said first stack, said first valve being to provide selective fluid communication through the arcuate valve slit with the spout aperture and prevent such fluid communication without said first valve coming into contact with the cap.

2. The flow control element of claim 1, wherein said lower portion of said first stack can engage an inside surface and an outside surface of the first mating member and thereby place said first stack in fluid communication with the spout aperture.

3. The flow control element of claim 2, wherein said lower portion can further engage a bottom surface of the first mating member.

4. The flow control element of claim 1, further comprising: a second stack having an upper portion being configured to be removably sealed within a second mating member of the drinking cup cap, the second mating member being in fluid communication with a vent aperture, said second stack being spaced apart from said first stack and defining a second valve providing selective fluid communication with the vent aperture.

5. The flow control element of claim 3, wherein the flow control element is formed of a single piece of elastomeric material.

6. The flow control element of claim 2, wherein said lower portion of said first stack engages said inner surface, said outer surface, and a bottom surface of the first mating member.

7. The flow control element of claim 1, further comprising a second stack, said second stack being removably sealable in a second mating surface of the drinking cup cap, the second mating surface being in fluid communication with a vent aperture, said second stack having a second valve for selective fluid communication with the vent aperture.

8. The flow control element of claim 7, wherein a portion of said second stack can engage an inside surface and an outside surface of the second mating surface.

9. The flow control element of claim 8, wherein said second stack can engage said inside surface, said outside surface, and a bottom surface of the second mating surface.

10. The flow control element of claim 7, wherein the flow control element is formed of a single piece of elastomeric material.

11. A drinking cup assembly comprising: a cup having an open end; a cap being adapted to seal said open end, said cap having a first aperture and a first mating member in fluid communication with said first aperture; and a flow control element, said flow control element having a first stack, said first stack being adapted to have an upper portion and a lower portion, said upper portion extending upwardly into and being removably sealed in said first mating member by said lower portion, said upper portion of said first stack having a first valve and a first valve face defined in a sidewall thereof, said first valve face being arcuate when seen in vertical section taken along the axis of flow through said first stack, said first valve face having a valve slit disposed thereon and defined therethrough, said valve slit having a substantially vertical orientation, the elongated extent of said valve slit being generally along the axis of flow of liquid through said first stack, said first valve being operative to selectively place said cup in fluid communication with said first aperture and prevent such fluid communication without said first valve coming into contact with said cup or said cap.

12. The drinking cup assembly of claim 11, wherein said lower portion of said first stack engages at least an inside and an outside of said first mating member.

13. The drinking cup assembly of claim 12, wherein said lower portion of said first stack engages said inside, said outside, and a bottom of said first mating member.

14. The drinking cup assembly of claim 11, wherein said flow control element is formed of a single piece of elastomeric material.

15. The drinking cup assembly of claim 11, wherein said cap further includes a second aperture and a second mating member in fluid communication with said second aperture.

16. The drinking cup assembly of claim 15, wherein said flow control element further comprises: a second stack having an upper portion and a lower portion, said lower portion for engaging three sides of said second mating member, said upper portion of said second stack including a second valve for selectively placing said cup in fluid communication with said second aperture.

17. The drinking cup assembly of claim 16, wherein said second valve is a duckbill valve.

18. The drinking cup assembly of claim 17, wherein said flow control element is formed of a single piece of elastomeric material.

19. The drinking cup assembly of claim 13, wherein said lower portion of said first stack has a rim that frictionally engages said inside, said outside, and a said bottom of said first mating member.

20. The drinking cup assembly of claim 11, wherein said lower portion of said first stack has an outer dimension that is larger than the outer dimension of an upper portion of said first stack.

21. The drinking cup assembly of claim 11, wherein said flow control element is formed of a single piece of elastomeric material.

22. The drinking cup assembly of claim 11, wherein said cap further includes an air vent having a second aperture and a second mating member in fluid communication with said second aperture.

23. The drinking cup assembly of claim 22, wherein said flow control element further comprises: a second stack having a portion for engaging an inside and an outside of said second mating member and thereby place said second stack in fluid communication with said second aperture.

24. The drinking cup assembly of claim 23, wherein said portion of said second stack engages said inside, said outside, and a bottom of said second mating member.

25. The drinking cup assembly of claim 23, wherein said second stack comprises a second valve.

26. The drinking cup assembly of claim 25, wherein said second valve is a duckbill valve.

27. A drinking cup assembly comprising:
a cup having an open end;
a cap adapted to seal said open end,
said cap having a drinking spout, a first mating member, a vent and a second mating member, said first mating member having a first mating surface and being in fluid communication with said spout; said second mating member having a second mating surface and being in fluid communication with said vent;
and a flow control element,
said flow control element having a first stack and a second stack, said first stack having a first valve face, first inner and outer surfaces and first upper and lower portions, said first upper portion having a first outer diameter and said first lower portion having a second outer diameter, wherein said first stack is sized to frictionally engage and hold in position said first mating surface of said first mating member and thereby place said first stack in fluid communication with said spout, wherein said first outer diameter is smaller than said second outer diameter, wherein said first valve face includes a first valve defined in a sidewall of said first stack, said first valve comprising a valve slit defined in said first valve face, wherein said valve slit has a substantially vertical orientation, the elongated extent of said valve slit being generally along the axis of flow of liquid through said first stack, and wherein said first valve face is connected to said first inner surface of said first stack;
wherein said second stack is sized to frictionally engage said second mating surface of said second mating member and thereby place said second stack in fluid communication with said vent, wherein said second stack has second upper and lower portions, said second upper portion having a third outer diameter and said second lower portion having a fourth outer diameter, and wherein said third outer diameter is smaller than said fourth outer diameter, and wherein said second stack has a second valve face, a second inner surface and a second outer surface, wherein said second valve face is connected to said second inner surface of said second stack, and wherein said second inner surface of said second stack is smooth and tapered.

28. The drinking assembly of claim 27, wherein said first outer surface of said first upper portion of said first stack is separated from said first mating surface of said first mating member.

29. The drinking assembly of claim 27, wherein said flow control element has a first flange extending outwardly from said first lower portion of said first stack, wherein said first mating member has a first rim, and wherein said first rim abuts against said first flange.

30. The drinking assembly of claim 29, wherein said first flange is substantially perpendicular to a longitudinal axis of said first stack, and wherein said first flange traverses a substantial portion of said cap.

31. The drinking assembly of claim 27, wherein said first stack has a first middle portion disposed between said first upper portion and said first lower portion, and wherein said first outer surface along said first middle portion has a substantially equal slope between said first upper portion and said first lower portion.

32. The drinking assembly of claim 27, wherein said second outer surface of said second upper portion of said second stack is separated from said second mating surface of said second mating member.

33. The drinking assembly of claim 27, wherein said flow control element has a second flange extending outwardly from said second lower portion of said second stack, wherein said second mating member has a second rim, and wherein said second rim abuts against said second flange.

34. The drinking assembly of claim 33, wherein said second flange is substantially perpendicular to a longitudinal axis of said second stack, and wherein said second flange traverses a substantial portion of said cap.

35. The drinking assembly of claim 27, wherein said second stack has a second middle portion disposed between said second upper portion and said second lower portion, and wherein said second outer surface along said second middle portion has a substantially equal slope between said second upper portion and said second lower portion.

36. The drinking assembly of claim 34, wherein said first flange is integrally molded with said second flange to secure said first stack with said second stack.

37. The drinking assembly of claim 27, wherein said first valve has a first slit formed therethrough.

38. The drinking assembly of claim 27, wherein said first mating member is a cylindrical recess.

39. The drinking assembly of claim 27, wherein said second mating member is a cylindrical recess.

40. The flow control element of claim 1, wherein said valve slit is normally closed.

41. The flow control element of claim 40, further comprising an air vent valve to selectively allow air to enter the cup, wherein said first stack is comprised of resilient elastomeric material, said normally closed valve slit being adapted to open when a suction applied by a user on the spout aperture forms a negative pressure of a first predetermined limit on said first valve face that overcomes the resiliency of said valve slit, causing at least a portion of said first valve face to deflect and in turn cause said valve slit to open, thereby to allow the contents of the cup to be drawn through said valve slit from the cup by the negative pressure, and to remain open when the negative pressure within the cup reaches a second predetermined limit that allows air to enter the cup through said air vent valve, the elastomeric properties of said upper portion of said first stack being sufficient to close said valve slit upon removal of the suction force to a level below the first and second predetermined limits.

42. The flow control element of claim 1, wherein said first stack has a step between said upper and lower portions to ensure that said sidewall of the upper portion of said first stack does not come into contact with the first mating member.

43. The drinking cup assembly of claim 11, wherein said valve slit is normally closed.

44. The drinking cup assembly of claim 43, further comprising an air vent valve to selectively allow air to enter the cup, wherein said first stack is comprised of resilient elastomeric material, said normally closed valve slit opens when a suction is applied by a user on the spout aperture to form a negative pressure of a first predetermined limit on said first valve face that overcomes the resiliency of said valve slit, causing at least a portion of the valve face to deflect and in turn cause said valve slit to open, thereby to allow the contents of the cup to be drawn through said valve slit from the cup by the negative pressure, and to remain open when the negative pressure within the cup reaches a second predetermined limit that allows air to enter the cup through the air vent valve, the elastomeric properties of said first valve being sufficient to close said valve slit upon removal of the suction force to a level below the first and second predetermined limits, respectively.

45. The drinking cup assembly of claim 11, wherein said first stack has a step between said upper and lower portions to ensure that the sidewall of said upper portion of said first stack does not come into contact with said first mating member.

46. The flow control element of claim 1, wherein said upwardly extending sidewall of said first stack communicates with and is closed by an uninterrupted top end, and said sidewall has a said first valve to provide selective fluid communication with the spout aperture.

47. The flow control element of claim 46, wherein said upwardly extending sidewall is of uniform height, and said top end is horizontally disposed on said sidewall.

48. The flow control element of claim 1, wherein said upper portion of said first stack that extends upwardly in the mating member is not in contact with the first mating member of the cap, and said first valve of said sidewall provides selective fluid communication with the spout aperture and prevents such fluid communication without said first valve coming into contact with the first mating member of the cap.

49. The drinking cup assembly of claim 11, wherein said first valve of said upper portion of said first stack that extends upwardly in said first mating member provides selective fluid communication with the spout aperture and prevents such fluid communication without said first valve coming into contact with said cup or said first mating member of said cap.

* * * * *